US007726231B2

(12) United States Patent
Eaton et al.

(10) Patent No.: US 7,726,231 B2
(45) Date of Patent: Jun. 1, 2010

(54) UTILITY PUMP

(75) Inventors: Aaron L. Eaton, Wentzville, MO (US); Lloyd Herbert King, Jr., Chesterfield, MO (US)

(73) Assignee: The Patent Store LLC

(*) Notice: Subject to any disclaimer, the term of this patent is extended or adjusted under 35 U.S.C. 154(b) by 446 days.

(21) Appl. No.: 11/803,197

(22) Filed: May 14, 2007

(65) Prior Publication Data

US 2008/0286126 A1 Nov. 20, 2008

(51) Int. Cl.
*F01B 31/00* (2006.01)
*F16J 15/18* (2006.01)

(52) U.S. Cl. ....................................... 92/165 R; 92/163

(58) Field of Classification Search ................... 92/163, 92/165 R; 417/374, 555.1; 29/888.021
See application file for complete search history.

(56) References Cited

U.S. PATENT DOCUMENTS

| | | | | | |
|---|---|---|---|---|---|
| 2,915,986 | A | * | 12/1959 | Sisson | 92/165 R |
| 3,006,282 | A | * | 10/1961 | Sisson | 92/163 |
| 3,124,080 | A | * | 3/1964 | Sisson | 92/168 |
| 3,669,575 | A | * | 6/1972 | Beckerer | 417/555.1 |
| 4,166,523 | A | * | 9/1979 | Fujii et al. | 188/322.17 |
| 4,301,826 | A | * | 11/1981 | Beckerer | 417/555.1 |
| 4,850,826 | A | * | 7/1989 | Detlefsen | 417/555.1 |

* cited by examiner

*Primary Examiner*—Michael Leslie
(74) *Attorney, Agent, or Firm*—Jacobson & Johnson LLC

(57) ABSTRACT

A lightweight, inexpensive, corrosion proof, utility pump having a flexible member forming a sliding interference fit with a pump rod with the flexible member confined between a pump rod bushing and an end cap to prevent leakage and a method of converting an inexpensive utility pump from a leaking condition to a non leaking condition without having to modify the existing components of the utility pump.

20 Claims, 3 Drawing Sheets

UTILITY PUMP

FIELD OF THE INVENTION

This invention relates generally to utility pumps and, more specifically, to improvements to lightweight utility hand pumps to inhibit or prevent leakage during use of the pump.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of lightweight, inexpensive, corrosion-proof, utility hand pumps for use in removing water from irrigation valve boxes, meter pits, pipe trenches or other places where water can accumulate is known in the art. Typically, all the components of the hand pumps are made from inexpensive plastics or elastomers. A benefit of use of plastic components in the pump is that the plastic is corrosion resistance and allows one to make an inexpensive hand pump that can sustain rough usage in the field. On the other hand a disadvantage of a hand pump made from plastic components is that it is difficult to mate the component parts to each other with the precision found in similar metal pumps. As a result leakage problems can occur in plastic pumps.

Typically, the plastic hand pumps include a plastic handle, which can be used to raise and lower a plastic piston within a plastic pipe. A one-way valve on the bottom of the pipe allows water to enter the bottom of the plastic pipe but prevents backflow out the bottom of the plastic pipe. With each upward stroke the piston lifts the water to a top end of the pipe that includes a plastic end cap having an outlet that directs the water into a side discharge spout, which carries the water away from the pump. The end cap is formed from a resilient polymer plastic material and contains an integral annular sealing member therein that forms a flexible or slide interference fit around the exterior surface of the pump rod shaft to provide a low cost end cap seal for the purposes of preventing leakage between the exterior surface of the pump rod and the annular slide surface of the end cap as the pump rod slides back and forth through the end cap. Unfortunately, the slide interference fit between the flexible end cap seal and the rigid pump rod fails to prevent leakage therepast. Attempts have been made to prevent leakage through the end cap seal through various methods including the use of sealing rings such as "O-rings". In addition, other types of sealing members have been used in attempt to prevent leakage through the end cap, which have also met with failure. While it is known that effective fluid seals can be made around sliding shafts such systems require precision parts and are costly to manufacture and to use such components in the utility hand pump would defeat the purpose of having a lightweight inexpensive, corrosion proof, utility hand pump. Consequently, while attempts to prevent leakage in these lightweight inexpensive, corrosion-proof, utility pumps have failed the users have tolerated the leakage because of the benefits of having an inexpensive, lightweight, corrosion-proof, utility pump. In addition, because the utility pump is made primarily from plastic components there generally exists lower expectations for plastic pumps than those made from metal parts. Also, since the utility pumps are used in the field of irrigation some leakage can be tolerated even though annoying. All these factors have led to a general acceptance of the leakage as an inherent characteristics of a plastic utility pump. The present invention solves the problem of inhibiting or preventing leakage in the inexpensive, lightweight, corrosion proof utility pumps while avoiding a costly redesign or use of costly pump components.

SUMMARY OF THE INVENTION

A lightweight, inexpensive, corrosion proof, utility pump having a flexible member forming a slide interference fit with a pump rod with the flexible member confined between a pump rod bushing and an end cap to prevent leakage and a method of converting an inexpensive utility pump from a leaking condition to a non leaking condition without having to modify the existing components of the utility pump.

DESCRIPTION OF THE PREFERRED EMBODIMENT

Figure 1:
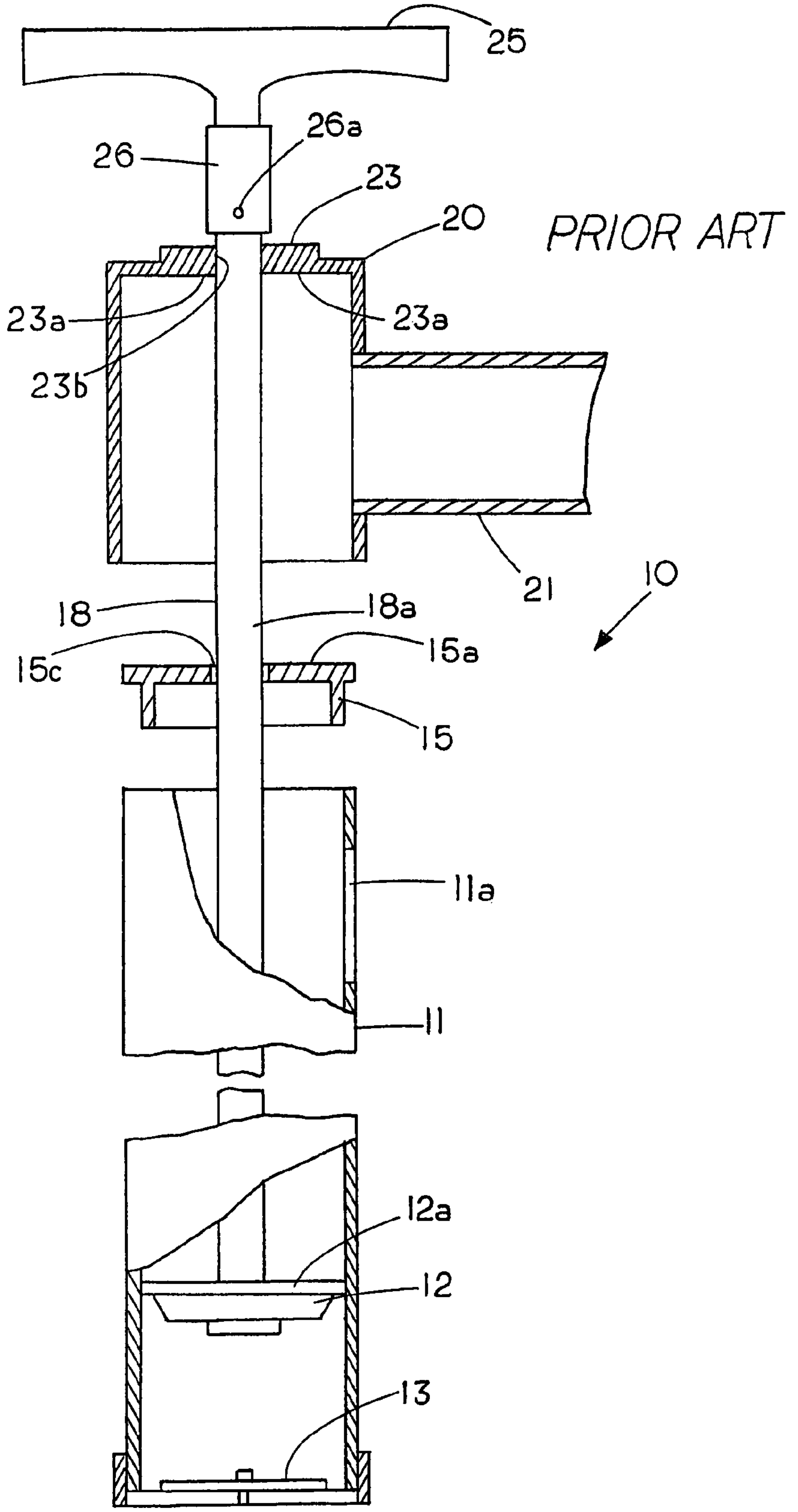
FIG. 1 is a partial sectional and exploded view of a prior art utility pump.

FIG. 1 is a sectional and exploded view of a prior art plastic utility pump 10 revealing the internal components of the utility pump. The lightweight, inexpensive, corrosion-proof, utility hand pump 10 is ideal for use in the irrigation industry for removing water from irrigation valve boxes, meter pits, pipe trenches or other places where water can accumulate. In addition, although lightweight, the plastic components provide ruggedness to the utility pump, which allows for use and abuse of the pump without rendering the pump inoperative. By plastic pump it is meant that substantially all the working components of the pump are made from either rigid or flexible polymer plastics.

The utility pump 10 achieves it's lightweight, inexpensive, corrosion proof, characteristics since it made from plastic and elastomer components, some of which are off the shelf items, to provide corrosion resistance. Since some of the components are off the shelf items the pump can be made inexpensively. Also, since the pump components are made from rigid polymer plastics the pump can withstand use and abuse in field conditions as it is carried from work site to work site. In addition those components made from elastomers or flexible polymer materials also provide durability to the utility pump.

FIG. 1 shows an exploded view of prior art pump 10 that includes a section of rigid plastic pipe 11, such as PVC that forms a cylinder for sliding engagement of a rigid piston 12 therein with piston 12 carrying a piston ring seal 12*a* which can be a flexible polymer plastic. The lower end of pipe 11 includes a one-way flap type valve 13, which can also contain a flexible polymer plastic, that allows water to enter the end of pipe 11 but prevents backflow therethrough while the upper end of pipe 11 includes a side opening 11*a* to allow water to be pumped therethrough. In some cases elastomers made from rubber could be substituted for the flexible flap type valve or the piston ring seal 12*a* without departing from the spirit of the low cost plastic pump.

Located above the top end of pipe 11 is a bushing 15 that maintains a the pump rod 18 in a central position in pipe 11. That is bushing 15 has an opening 15*c* therein that has a diameter that is larger than the diameter of pump rod 18 to allow rigid pump rod to freely slide therethrough while at the same time maintaining the pump rod 18 in a central location in the pipe 11. Also located on pump rod 18 is a flexible but form sustaining end cap 20 that contains a spout 21 for carrying water away from the pump 10. The top of end cap 20 includes an integral sealing member 23 that has an annular surface 23*b* that forms an interference fit with the external cylindrical surface 18*a* of the pump rod 23. The purpose of the interference slide fit between the rigid pump rod 18 and the integral flexible sealing member 23 is to prevent leakage of water therepast as the pump rod 18 slides back and forth through the integral sealing member 23 as one operates pump 10. Unfortunately, when one operates pump 10 water leaks past the integral sealing member 23 even though there is provide an interference slide fit between the internal sidewall of the integral sealing member 23 and the pump rod 18. A handle 25 connects to the top end of pump rod 18 to allow a user to slide the pump rod 18 back and forth through the integral sealing member 23 to thereby direct water though the side opening 11*a*. It is the pump 10 as shown in FIG. 1 which has been plagued with leakage along pump rod 18 in spite of the use of an integral sealing member 23.

Figure 2:
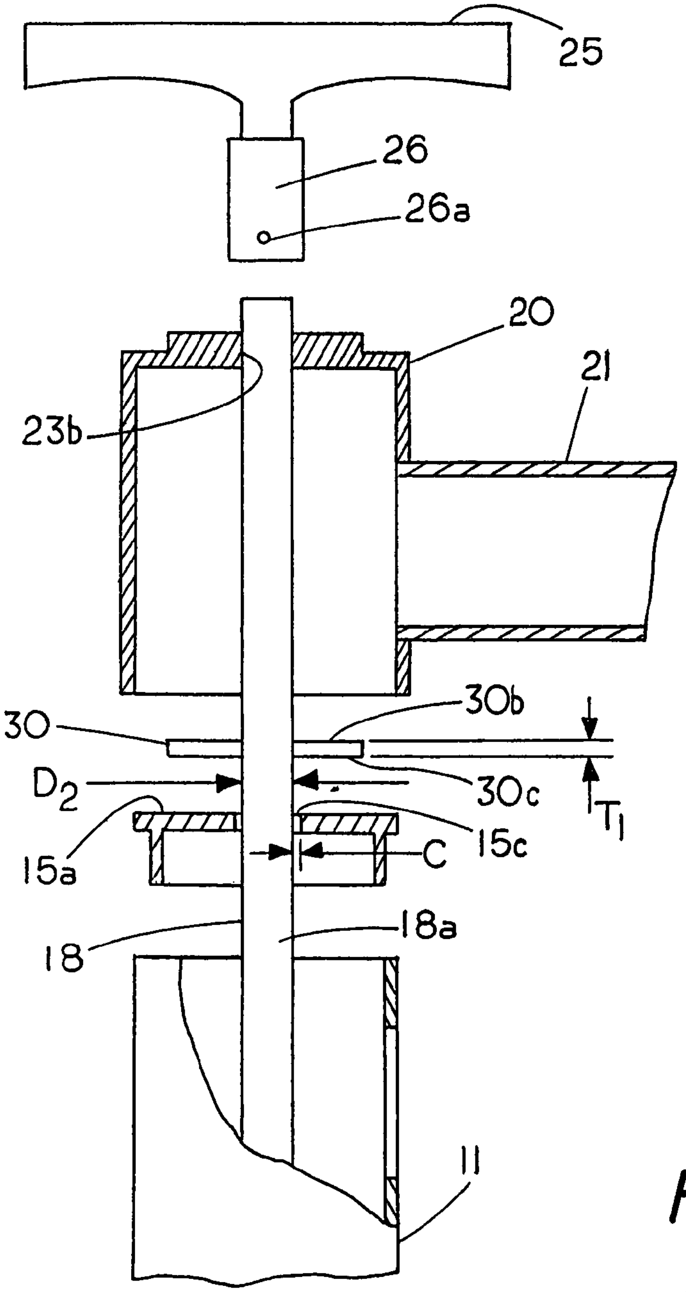
FIG. 2 is a partial sectional and exploded view of a prior art utility pump of FIG. 1 with a flexible member therein to prevent leakage.

FIG. 2 shows a top portion of the utility pump 10 of FIG. 1 and is identical to the top portion of FIG. 1 with the exception that in FIG. 2 an annular flexible member comprising a disk 30 is shown located around pump rod 18 and the handle 25 has been removed from pump rod 18 to allow the flexible disk 30 to be installed on the pump rod 18. That is the fastener 26*a* in coupling 26 has been withdrawn to allow separation of handle 25 from pump rod 18.

Figure 2A:
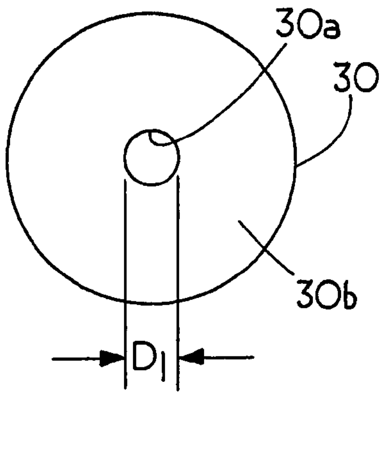
FIG. 2A is a front view of the flexible member.

Flexible disk 30 is shown in isolated view in FIG. 2A and includes an inner annular bearing or wear surface 30*a* that forms an interference slide fit with the exterior cylindrical surface 18*a* of rigid elongated pump rod 18, which is formed from an off the shelf polymer plastic rod. The diameter $D_1$ of the annular wear surface 30*a* is slightly less than the external diameter $D_2$ of the pump rod 18 to provide an interference fit that forms a seal therebetween much as the integral sealing member 23 provides a seal between pump rod 18 and itself. In operation annular flexible disk 30 creates a wiping action along pump rod 18 similar to the wiping action created by integral sealing member 23 and pump rod 18. However, the results are different as explained hereafter.

Figure 3:
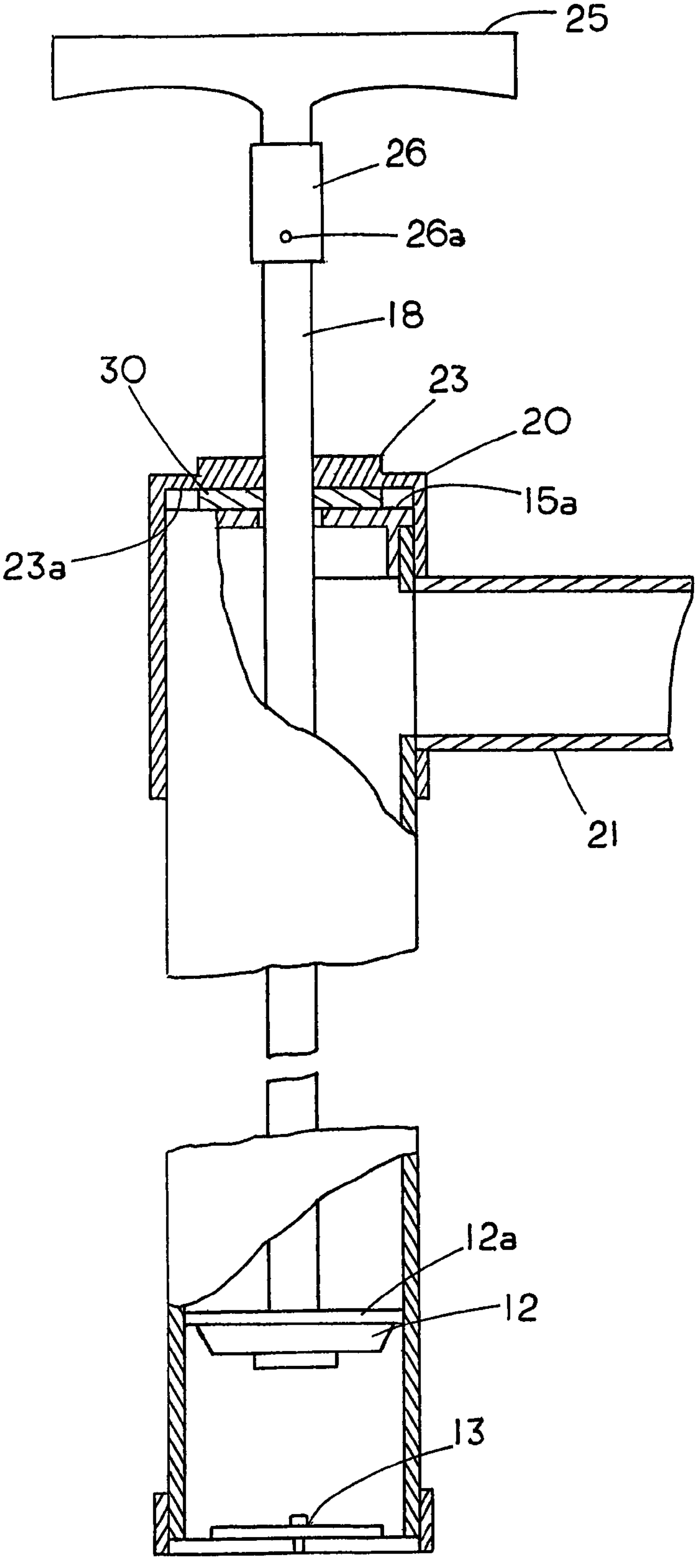
FIG. 3 is a partial sectional view of a prior art utility pump fitted with the flexible member of FIG. 2A to prevent leakage along the plunger rod.

FIG. 3 shows the pump 10 of FIG. 2 in an assembled condition with the annular flexible disk 30 sandwiched between the undersurface 23*a* of the integral sealing member 23 in end cap 20 and the top surface 15*a* of bushing 15. That is, the flexible disk 30 is restrained from axial displacement on the topside by the end cap 20 and on the bottom side by bushing 15.

When in the assembled condition, as shown in FIG. 3, one can grasp handle 25 and raise and lower pump rod 18 causing piston 12 to draw water up pipe 11 wherein it can be discharged through the side opening 11*a* and the spout 21. Surprisingly, while it has been found that while the integral sealing member 23 fails to prevent leakage along the pump rod 18 the sole addition of the flexible disk 30, which also wipes along the pump rod 18, does prevent water from leaking past the end cap 20. That is, when the integral flexible member 23 is used alone leakage occurs through the end cap 20; however, by confinement of a flexible disk 30 between the bushing 15 and the end cap 20 does prevent water from leaking therepast even though the flexible disk is not radially restrained. The flexible disk 30 is preferable made from a material such as silicone which can have an inherent lubricity to minimized resistance to sliding of pump rod therethrough. A commercially available silicone washer having a durometer of about 60 A (based on ASTM D2240) and an interference fit preferable about 0.005 inches and a thickness of about 0.010 inches has been found to provide a wiping action and provide excellent results without appreciable increasing resistance to the pump rod sliding therethrough. It should be pointed out that the increasing of the thickness of the integral sealing member 23 by the amount of thickness of the flexible disk 30 fails to provide the benefits obtained by using the separate flexible disk 30 as shown in FIG. 3.

Thus, a feature of the invention is the method of converting an all plastic utility hand pump 10 from a leaking condition to a non-leaking condition without altering components of the utility pump by placing a flexible disk in an interference fit around a utility pump rod and sandwiching the flexible disk between a pump rod bushing and the elastomer sealing member. Another feature of the invention is having a utility pump with a first sealing member forming an interference slide fit that is an ineffective seal on the utility pump and a second sealing member also forming an interference slide fit which is placed next to the first sealing member to produce an effective leak proof seal on the utility pump.

In order to convert a leaking pump 10 to a non-leaking pump one can remove a handle 25 from the pump rod 18, as illustrated in FIG. 2, and an end cap 20 from the utility pump 10 and then place the flexible disk 30 on the pump rod 18 and reassemble the utility pump to restrain the flexible disk 30 from sliding along the pump rod 18 by confining flexible disk between the pump rod bushing 15 and the end cap 20. Thus a feature of the invention is a low cost method of converting the utility hand pump 10 from the leaking condition to the non-leaking condition that occurs solely through placement of the flexible disk around the pump rod 18 and without altering any of the components of the utility pump 10.

We claim:

1. An inexpensive plastic utility pump comprising:

a pipe having a first end for drawing water therein;

a pump rod slideable in said pipe;

a bushing located in a second end of the pipe with the bushing providing a guide for slideable displacement of the pump rod therethrough;

an end cap having an integral sealing member forming an interference slide fit with the pump rod as the pump rod slides back and forth therethrough; and a flexible member located between said bushing and said end cap with said flexible member forming a further interference slide fit with said push rod while being retained between the end cap and the bushing to prevent leakage through the end cap of the utility pump.

2. The utility pump of claim 1 wherein the flexible member is a washer having an inner annular wear surface and a top face with the top face in face to face contact with the end cap.

3. The utility pump of claim 1 wherein the flexible member has a central annular sealing surface having a dimension $D_1$ and the pump rod has a diameter $D_2$ with the dimension $D_2$ being greater than $D_1$ by at least 0.005 inches.

4. The utility pump of claim 1 wherein the flexible member is silicone having a durometer of A60.

5. The utility pump of claim 1 wherein the flexible member has an outside diameter larger than the opening in the bushing.

6. The utility pump of claim 2 wherein the washer is supported on a topside of the bushing and is restrained from axial displacement by the end cap and the bushing.

7. The utility pump of claim 6 wherein the pipe, the pump rod, the end cap and the flexible member are polymer plastics.

8. The utility pump of claim 1 wherein the pipe comprise PVC pipe.

9. The utility pump of claim 6 wherein the flexible member has a minimum thickness of 0.09 inches.

10. The method of converting a plastic utility hand pump from a leaking condition to a non-leaking condition without altering components of the utility hand comprising;

placing a flexible member in an interference slide fit around a utility pump rod; and axially restraining the flexible member between a pump rod bushing and an end cap.

11. The method of claim 10 including the step of removing a handle from the pump rod and an end cap from the utility pump and then placing the flexible member on the pump rod.

12. The method of converting a plastic utility hand pump from a leaking condition to a non-leaking condition without altering components of the utility hand comprising; placing a flexible member in an interference slide fit around a utility pump rod; and restraining the flexible member from sliding along the pump rod with a pump rod bushing and an end cap.

13. The method of claim 10 including the step of converting the utility hand pump from the leaking condition to the non leaking condition solely through placement of a silicone flexible member in an slide interference fit on the pump rod.

14. The method of claim 10 wherein the flexible member is provided with integral lubricity.

15. The method of claim 10 including the step of axially restraining the flexible member solely through confinement between the end cap and the bushing.

16. An irrigation utility pump comprising:

a plastic pipe;

a pump rod;

a piston slideable in the plastic pipe;

a bushing forming a pump rod guide located in one end of the plastic pipe;

a flexible end cap extending over the bushing with the end cap having a sealing surface that sliding engages the pump rod with the improvement comprising;

a flexible member confined between the flexible end cap and the pump rod bushing with the flexible member forming an interference slide fit with the pump rod to prevent leakage through the end cap.

17. The irrigation utility pump of claim 16 wherein the flexible member is inserted into the utility pump after the initial assembly of the utility pump.

18. The irrigation utility pump of claim 16 wherein the pump rod, the piston, the bushing or the flexible end cap of the plastic utility pump have not been modified to provide the leakproof utility pump.

19. The irrigation utility pump of claim 16 wherein the sealing surface on the flexible end cap forms an ineffective seal and the flexible member located proximate thereto provide a leakproof seal to the utility pump.

20. The irrigation utility pump of claim 16 wherein the flexible member is sandwiched between an undersurface of the integral sealing member in the end cap and a top surface of the bushing to thereby restrain the flexible member from axial displacement on the topside by the end cap and on the bottom side by the bushing.

* * * * *